United States Patent
Su

(10) Patent No.: US 6,191,317 B1
(45) Date of Patent: Feb. 20, 2001

(54) PROCESS FOR PREPARATION OF POLYALKYL HYDROXYAROMATICS

(75) Inventor: Wei-Yang Su, Austin, TX (US)

(73) Assignee: Huntsman Petrochemical Corporation, Austin, TX (US)

( * ) Notice: Under 35 U.S.C. 154(b), the term of this patent shall be extended for 0 days.

(21) Appl. No.: 09/386,870

(22) Filed: Aug. 31, 1999

(51) Int. Cl.⁷ .......................... C07C 37/00; C07C 39/18; C08G 63/87
(52) U.S. Cl. .......................... 568/790; 568/780; 528/205
(58) Field of Search .................................. 568/780, 790; 528/205

(56) References Cited

U.S. PATENT DOCUMENTS

| | | | |
|---|---|---|---|
| 2,398,253 | 4/1946 | Rogers et al. | 260/137 |
| 2,655,544 | 10/1953 | McNulty et al. | 260/609 |
| 2,671,117 | 3/1954 | Kluge et al. | 260/624 |
| 2,986,588 | 5/1961 | Schramm | 260/683.15 |
| 4,144,138 | 3/1979 | Rao et al. | 302/46 |
| 4,152,499 | 5/1979 | Boerzel et al. | 526/52.4 |
| 4,238,628 | 12/1980 | Cahill et al. | 568/736 |
| 4,322,220 | 3/1982 | Machleder et al. | 44/75 |
| 4,822,921 | 4/1989 | Knifton et al. | 565/698 |
| 5,300,701 | 4/1994 | Cherpeck | 568/792 |
| 5,334,775 | 8/1994 | Gutierrez et al. | 568/791 |

FOREIGN PATENT DOCUMENTS 1159368   7/1969   (GB).

OTHER PUBLICATIONS

Rohm and Haas Company, Amberlyst Polymeric Catalysts Brochure entitled: Summary of Typical Properties and Applications, 1992.

*Primary Examiner*—Paul J. Killos
*Assistant Examiner*—J. Parsa
(74) *Attorney, Agent, or Firm*—O'Keefe, Egan and Peterman

(57) ABSTRACT

Polyalkyl hydroxyaromatics may be prepared from polyalkylenes and hydroxyaromatics in the presence of an acid catalyst and an organic solvent having a boiling point range with an initial boiling point value of below or about the boiling point of the selected hydroxyaromatic reactants and final boiling point of above or equal to about the boiling point of alkylhydroxyaromatic by-product of the reaction. Using this method, accumulation of undesirable alkylhydroxyaromatic by-product/s in a reaction vessel may be minimized, and/or viscosity of polyalkyl hydroxyaromatic product reduced, allowing for increased ease of transfer and transportation.

22 Claims, 1 Drawing Sheet

PROCESS FOR PREPARATION OF POLYALKYL HYDROXYAROMATICS

BACKGROUND OF THE INVENTION

1. Field of the Invention

This invention relates to preparation of polyalkyl hydroxyaromatics from polyalkylenes and hydroxyaromatics. More particularly, this invention relates to production of polyalkylphenols such as polybutylphenol, from the reaction of polyalkylenes such as polybutylene with hydroxyaromatics such as phenol, in the presence of an acid catalyst and an organic solvent having a boiling point range of from at about or below the boiling point of the hydroxyaromatic to at about or above the boiling point of alkylhydroxyaromatic by-products of the reaction.

2. Description of Related Art

Polyalkyl hydroxyaromatics may be prepared by alkylating hydroxyaromatics with polymeric olefins in the presence of acidic catalysts. During such a process, some extent of depolymerization is typical, leading to the production of undesirable alkylhydroxyaromatics. For example, tert-butylphenol is an undesirable alkylphenol by-product which typically occurs during polybutene alkylation of phenol. In a typical polybutylene alkylation process, excess amounts of phenol are commonly employed to ensure good yields of polybutylphenol product. Unreacted phenol is then typically separated from polybutylphenol product and recycled to the alkylation reactor. In conventional alkylation processes, tert-butyl phenol is typically present in the phenol recycle stream. Consequently, tert-butylphenol tends to build up in the alkylation reactor, resulting in reduced yield of polybutylphenol. To maintain tert-butyl phenol content at an acceptable level within an alkylation reactor (for example less than about 2% by weight), separation is typically required. Separation of tert-butylphenol from the alkylation process stream typically requires additional process steps, costs and necessitates system downtime. Depending on the method of separation employed, substantial amounts of phenol reactant may be lost and waste product containing tert-butylphenol generated and disposed of. For example, removal of tert-butylphenol from phenol is typically accomplished by fractional distillation.

A number of processes have been developed in an attempt to address depolymerization during alkylation reactions. Such processes utilize specific catalysts and/or alkylene polymers having specific structural characteristics selected to result in reduced production of alkylhydroxyaromatics such as tert-butylphenol. However, these processes typically do not eliminate depolymerization and/or may result in reduced yields of polyalkyl hydroxyaromatic product. Furthermore, these processes may restrict catalyst selection and/or require use of specific polymer compounds having certain chemical structures.

In a typical alkylation process, excess amount of a hydroxyaromatic reactant is commonly employed to ensure good yields of polyalkyl hydroxyaromatic product. For example, in a process for alkylating phenol with polybutylene, excess phenol is typically employed. Following reaction, unreacted phenol is typically separated from the polybutylphenol product and recycled to the alkylation reactor. In a conventional process, tert-butylphenol by-product is typically present in the unreacted phenol recycle stream. Consequently, tert-butyl phenol tends to build up in the alkylation reactor, resulting in reduced yield of polybutylphenol. Because increased concentration of alkylhydroxyaromatic in the alkylation reactor results in decreased polyalkyl hydroxyaromatic yield, it is typically necessary to remove alkyl hydroxyaromatics, such as tert-butylphenol from an alkylation system on a periodic basis. Removal of alkylphenol is typically accomplished by high temperature stripping. The necessity of removing alkylphenols from an alkylation reaction system increases cost and results in down time.

In addition to the above concerns, polyalkyl hydroxyaromatic products from conventional alkylation processes are typically relatively viscous liquids that may be difficult to pump and transport.

SUMMARY OF THE INVENTION

Disclosed herein is a process for the preparation of polyalkyl hydroxyaromatics from hydroxyaromatic and polyalkylene reactants using solid acid catalyst/s. The process may employ solvent having a boiling point range with an initial boiling point less than or equal to about the boiling point of hydroxyaromatic reactant, and a final boiling point greater than or equal to about the boiling point of undesirable alkylhydroxyaromatic by-product/s associated with the reactants employed in the specific reaction. Surprisingly, utilizing a solvent having such a boiling point range, polyalkyl hydroxyaromatics may be prepared consistently, and with a minimum of downtime, from the corresponding hydroxyaromatic and polyalkylene reactants while minimizing or substantially eliminating build up of alkylhydroxyaromatic in the reaction vessel, such as may be encountered with low molecular weight/lower boiling point solvents employed in conventional alkylation processes. Instead, alkylhydroxyaromatic may be substantially absent from the reaction vessel or concentration of alkylhydroxyaromatic in the reaction vessel may reach steady state at an acceptable level. This is in contrast to conventional processes, in which lower molecular weight/lower boiling point solvents tend to distill off and be recycled with unreacted hydroxyaromatic compounds, stripping or carrying with them undesirable alkylhydroxyaromatic by-product/s, which then tend to accumulate in the reactor. Advantageously, catalyst life may be substantially unaffected using the disclosed process, and in one embodiment a catalyst may be reused for extended periods of time without regeneration.

Among other things, an organic solvent may be a mixture of aliphatic compounds and/or derivatized aliphatic compounds having a boiling point range suitable for a particular alkylation process. In one embodiment for the alkylation of phenol with polybutylene, an organic solvent employed in the preparation of polybutylphenol from phenol and polybutylene may be a mixture having a boiling point range with an initial boiling point less than the boiling point of phenol and a final boiling point at about the boiling point of tert-butylphenol. For example, such a solvent may be a mixture of paraffin and/or alkene compounds having a boiling point range lying within the overall range of from about 160° C. to about 350° C., alternatively from about 160° C. to about 300° C., alternatively from about 170° C. to about 250° C., alternatively from about 180° C. to about 210° C., alternatively from about 190° C. to about 210° C. In this embodiment, benefits of the disclosed process may be realized with organic solvents lying anywhere within these ranges, although in other embodiments the initial or minimum boiling point of such a solvent may be from about 160° C. to about 190° C., alternatively from about 160° C. to about 180° C., alternatively about 170° C.; and the final or maximum boiling point may be from about 210° C. to about 350° C., alternatively from about 210° C. to about 300° C., alternatively from about 250° C. to about 300° C., and alternatively about 250° C., it being understood that a solvent having any combination of initial and final boiling points selected from any of the respective forgoing initial and/or final boiling point ranges is possible. Such a solvent is as opposed to a solvent having, for example, a boiling point of from about 80° C. to about 100° C., as is often conventionally employed.

When employed in a polyalkyl hydroxyaromatic alkylation process which incorporates excess hydroxyaromatic and an unreacted hydroxyaromatic recycle stream, part of the disclosed organic solvent will separate from the product stream and remain with, or act as a chaser for, the recycled unreacted hydroxyaromatic. The balance of the organic solvent will remain with the polyalkyl hydroxyaromatic product stream. Advantageously, due to the boiling point range characteristics of the solvent, undesirable alkylhydroxyaromatic by-product/s tend to remain in the polyalkyl hydroxyaromatic product stream. Thus, the disclosed process may be used to provide a way to recycle unreacted hydroxyaromatic to an alkylation reactor in a recycle stream containing little or substantially no undesirable alkylhydroxyaromatic byproducts, and/or accumulation or build up of alkylhydroxyaromatic in an alkylation reactor may be reduced or substantially prevented. Further advantageously, since part of the solvent remains with the polyalkylhydroxyaromatic product and lowers its viscosity, the product is made easier to pump and/or transport for sale.

In one respect, disclosed is a process for preparing polyalkyl hydroxyaromatic, including contacting hydroxyaromatic and polyalkylene with an acid catalyst in the presence of an organic solvent to form a reaction component including polyalkyl hydroxyaromatic, alkylhydroxyaromatic by-product, unreacted hydroxyaromatic and the organic solvent; and separating by distillation at least a portion of the unreacted hydroxyaromatic from the reaction component to form a product component including polyalkyl hydroxyaromatic; wherein the organic solvent may have a boiling point range with an initial boiling point sufficiently close to the boiling point of the hydroxyaromatic reactant and a final boiling point sufficiently close to the boiling point of the alkylhydroxyaromatic by-product such that reduced concentrations of alkylhydroxyaromatic by-product is present in the unreacted hydroxyaromatic separated by distillation from the polyhydroxyaromatic product as compared to such a separation carried out employing an organic solvent having a boiling point less than the boiling point of the hydroxyaromatic reactant. In one embodiment, the acid catalyst may be at least one of acid resin catalyst, acidic metal oxide, acidic molecular sieves, or a mixture thereof. The organic solvent may includes a mixture of alkanes having carbon chain lengths varying within the range of from about 8 to about 16 carbon atoms.

In another respect, disclosed is a process for preparing polybutylphenol, including introducing phenol, polybutylene and organic solvent components into a reaction vessel containing an acid catalyst, the components being introduced separately or in combination as one or more feed streams, the organic solvent including a mixture of alkanes and having a boiling point range with an initial boiling point of from less than about the boiling point of the phenol to about 190° C. and a final boiling of from about 210° C. to greater than about the boiling point of the tertiary butylphenol, and wherein the acid catalyst includes at least one of acid resin catalyst, acidic metal oxide, acidic molecular sieves, or a mixture thereof; reacting at least a portion of the phenol with at least a portion of the polybutylene at temperature of from about 0° C. to about 100° C. in the presence of the acid catalyst to form a reaction product including polybutylphenol and tert butylphenol; withdrawing the reaction product as at least one reaction stream from the reaction vessel, the reaction stream including polybutylphenol, tert butylphenol, unreacted phenol and the solvent; separating at least a portion of the unreacted phenol from the reaction stream by distillation at a temperature and pressure effective to form a product stream including polybutylphenol, tert-butyl phenol and solvent, and a recycle stream including phenol, solvent, and less than or equal to about 2% by weight tert-butylphenol; and introducing the recycle stream into the reaction vessel with the one or more feed streams. In one embodiment, the recycle stream includes from about 10% to about 20% by weight of phenol, from about 0% to about 2% by weight of tertiary butylphenol, and from about 80% to about 90% by weight of the solvent; and the product stream includes from about 45% to about 80% by weight of polybutylphenol, from about 0.1% to about 3% by weight of tert butylphenol, and from about 10% to about 30% by weight of the solvent. Using this process, a build up of tertiary butylphenol content in the reaction stream may be substantially prevented. The organic solvent may include a mixture of alkanes having carbon chain lengths varying within the range of from about 8 to about 16 carbon atoms, alternatively the organic solvent may include a mixture of alkanes having carbon chain lengths varying within the range of from about 10 to about 14 carbon atoms.

In another respect, disclosed is a process for preparing polybutylphenol, including introducing phenol, polybutylene and organic solvent components into a reaction vessel containing an acid catalyst, the organic solvent mixture including a mixture of alkanes and having a boiling point range with an initial boiling point of from about 160° C. to about 180° C. and a final boiling point of from about 210° C. to about 300° C., and the acid catalyst including at least one of acid resin catalyst or a mixture thereof; reacting at least a portion of the phenol with at least a portion of the polybutylene at temperature of from about 0° C. to about 100° C. in the presence of the acid catalyst to form a reaction product including polybutylphenol and tert butylphenol; withdrawing the reaction product as at least one reaction stream from the reaction vessel, the reaction stream including polybutylphenol, tert butylphenol, unreacted phenol and the solvent; separating at least a portion of the unreacted phenol from the reaction stream by distillation at a temperature and pressure selected to form a product stream including polybutylphenol, tert-butyl phenol and solvent, and a recycle stream including from about 10% to about 20% by weight phenol, from about 80% to about 90% by weight solvent, and from about 0% to about 2% by weight tert butylphenol; and introducing the recycle stream into the reaction vessel with the one or more feed streams; wherein the polybutylene may have a number average molecular weight of from about 300 to about 5000; and wherein the product stream includes from about 45% to about 80% by weight of polybutylphenol, from about 0.1% to about 3% by weight of tert butylphenol, and from about 15% to about 30% by weight of the solvent. In one embodiment, a build up of tertiary butylphenol content in the reaction stream may be substantially prevented.

DESCRIPTION OF ILLUSTRATIVE EMBODIMENTS

Figure 1:
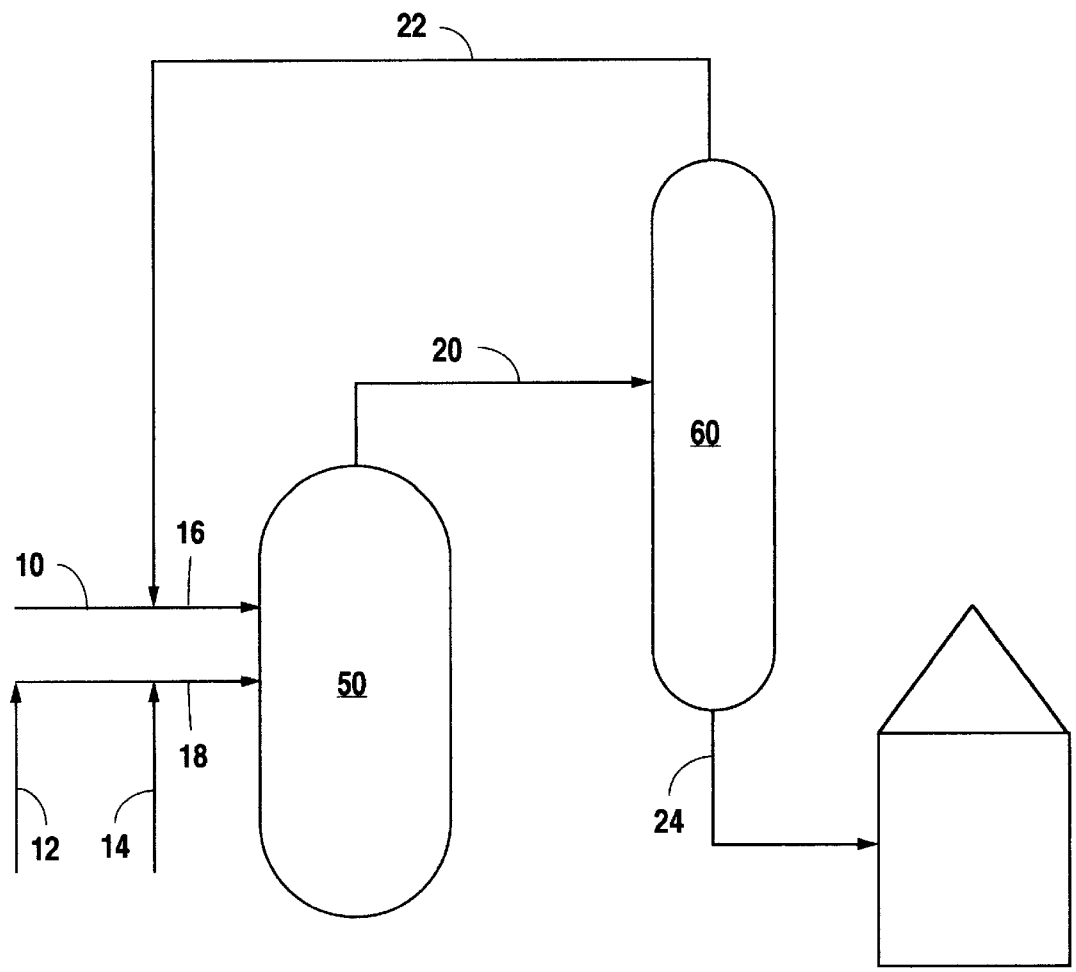
FIG. 1 is a simplified process schematic according to one embodiment of the disclosed process.

The disclosed process provides a method for the production of polyalkylhydroxyaromatics from hydroxyaromatics and polyalkylenes which employs an organic solvent having a boiling point range which in one embodiment extends from below or equal to about the boiling point of the hydroxyaromatic reactant to above or equal to about the boiling point of undesirable alkylhydroxyaromatic by-product. In another embodiment, the boiling point range may extend from an initial boiling point sufficiently close to the boiling point of the hydroxyaromatic reactant to a final boiling point sufficiently close to the boiling point of undesirable alkylhydroxyaromatic by-product so that the solvent is effective to result in reduced concentrations of alkylhydroxyaromatic by-product present in unreacted phenol separated from the polyhydroxyaromatic product as compared to conventional solvents having lower boiling points. With benefit of this disclosure, those of skill in the art will understand that such a solvent may have an initial or minimum boiling point of above the boiling point of the hydroxyaromatic reactant, and a final or maximum boiling point of below the boiling point of the undesirable alkylhydroxyaromatic by-product.

Further, as will be understood with benefit of this disclosure by those of skill in the art, a boiling point range may vary depending on boiling point of particular reactants employed, as well as individual process requirements such as desired product yield and recycle stream purity. In one embodiment, a suitable organic solvent is a solvent which has a boiling point range suitable to reduce or substantially prevent accumulation of undesirable alkylhydroxyaromatic by-product in an alkylation reactor having an unreacted phenol recycle stream as described elsewhere herein, for example in one exemplary case by limiting amount of undesirable alkylhydroxyaromatic by-product in the recycle stream to less than about 2 weight percent, alternatively to less than about 1 weight percent, alternatively to from about 0 weight percent to about 2 weight percent. However, benefits of the disclosed method may be obtained with reduced concentrations of alkylhydroxyaromatic by-product in an unreacted phenol recycle stream of equal to or greater than about 2 weight percent as well. It will also be understood that an initial or minimum boiling point of a suitable organic solvent may be above, equal to, or below the boiling point of the hydroxyaromatic reactant, and the final or maximum boiling point of a suitable organic solvent may be below, equal to, or above the boiling point of the undesirable hydroxyaromatic by-product.

In one embodiment, the process may be employed in a reaction process scheme in which alkylation occurs between excess hydroxyaromatic reactant and polyalkylene in a reaction vessel containing a solid acid catalyst, and in which separation of polyalkyl hydroxyaromatic reaction product from unreacted hydroxyaromatic reactant occurs via distillation column. As used herein, "distillation" means any distillation or distillation-based process known in the art suitable for separating polyalkyl hydroxyaromatic reaction product from unreacted hydroxyaromatic reactant. The unreacted hydroxyaromatic reactant may be recycled along with lower boiling point components of the solvent to the reactor and mixed with a feed stream incoming to the reactor containing polyalkylene, fresh make-up hydroxyaromatic and make-up organic solvent mixture. As used herein, "fresh" is used to describe non-recycled components introduced into a reaction vessel. Higher boiling point components of the solvent and alkylhydroxyaromatic byproducts are contained in the polyalkylhydroxyaromatic product stream exiting the distillation column. Thus, in one embodiment, make-up organic solvent may be selected to be richer in higher carbon count paraffin components to replace any higher boiling point components that are contained in the product stream to maintain the desired boiling point range of solvent present in an alkylation reactor.

FIG. 1 illustrates one embodiment of the disclosed alkylation process used in the preparation of polybutenephenol (polyisobutylphenol). In FIG. 1, an incoming stream 10 of fresh phenol, an incoming stream 12 of fresh organic solvent, and an incoming stream 14 of polyisobutylene are provided to alkylation reactor 50. Alkylation reactor 50 contains solid acid catalyst suitable for alkylation of phenol to form a reaction stream 20 containing polyalkyl phenol. Reaction stream 20 also may contain unreacted phenol, alkylphenol by-product and organic solvent. Reaction stream 20 is introduced into distillation column 60 in which unreacted phenol is separated from polyalkyl phenol product. In this regard, unreacted phenol is recycled via recycle stream 22 to alkylation reactor 50, in this example after being mixed with incoming fresh phenol stream 10. Recycle stream 22 also contains a lower boiling point portion of organic solvent, which is distilled off in column 20. Polybutylphenol product stream 24 is withdrawn from distillation column 60 and also includes tert-butyl phenol byproduct and remaining higher boiling point portion of the organic solvent. As substantially all of undesirable tert-butylphenol by-product exits the system via product stream 24, recycle stream 22 contains little or substantially no butylphenol byproduct to be recycled to reactor 50. Therefore, build up or accumulation of undesirable butylphenol by-product in the alkylation reaction system is reduced or substantially prevented, reducing or substantially eliminating the need for separation of butylphenol by-product from unreacted phenol.

Although one embodiment of an alkylation process for producing polyisobutylphenol is illustrated in FIG. 1, it will be understood with benefit of this disclosure by those of skill in the art that the benefits of the disclosed process may be realized with other reactants and process configurations, and with both continuous and batch methods. Further, such a process may also be employed for the alkylation of hydroxyaromatics other than phenol using polyalkylenes other than polyisobutylene. For example, information on suitable alkylation reactants, corresponding products, and catalysts may be found, for example, in U.S. Pat. Nos. 2,398,253; 2,671,117; 2,655,544; 4,238,628; 4,322,220; and 5,300,701; as well as in British Patent No. 1,159,368; all of the foregoing being incorporated herein by reference. Furthermore, although polyalkylene reactant is introduced as the last feed stream component in the embodiment of FIG. 1 (to minimize depolymerization effects), it will be understood that reactants and organic solvent may be introduced to an alkylation reaction vessel in a single combined flow stream or in separate flow streams for each incoming component, or any combination thereof. For example, incoming reactant stream/s, recycle stream/s and/or solvent/s may be combined or introduced separately into reaction vessel 50 in any combination desired. Furthermore, multiple alkylation reaction vessels and/or distillation columns may be employed.

In one embodiment, examples of hydroxyaromatic compounds which may be alkylated with polyalkylenes using the disclosed process include, but are not limited to, phenol and other hydroxyaromatic compounds. In this embodiment, hydroxyaromatic compounds include, but are not limited to, mononuclear, monohydroxy and polyhydroxyaromatic compounds having from about one to about three, alternatively from about one to about two hydroxy groups. Specific examples include, but are not limited to, phenol, catechol, resourcinol, etc. In another embodiment, polynuclear hydroxyaromatics such as napthol may be alkylated.

Examples of polyalkylene reactants which may be employed to alkylate hydroxyaromatic compounds in the practice of the disclosed process include, but are not limited to, olefin polymers having number average molecular weight from about 300 to about 5000. In one embodiment, polyisobutylene having a number average molecular weight from about 300 to about 5,000, alternatively from about 400 to about 3,000 and further alternatively from about 500 to about 2,000, may be employed. However, number average molecular weight values less than about 300 and greater than about 5,000 are also possible. Further information, on preparation of higher molecular weight olefins, such as polyisobutene, may be found in U.S. Pat. Nos. 2,986,588; 4,152,499; 4,238,628; 4,322,220; 5,300,701; and British Patent No. 1,159,368, each of which is incorporated herein by reference.

In one exemplary embodiment, polyisobutylene is employed as a polyalkylene reactant. Suitable polyisobutylenes include those having number average molecular weights from about 300 to about 5,000, alternatively from about 400 to about 3,000 and further alternatively from about 500 to about 2,000. Examples of specific polyisobutenes include, but are not limited to "H35" available from Amoco Chemical Company (number average molecular weight of about 670), "ULTRAVIS 10" (available from British Petroleum and having a number average molecular weight of about 950 and a methylvinylidene content of about 76 percent), "ULTRAVIS 30" (available from British Petroleum and having a number average molecular weight of about 1300 and a methylvinylidene of about 74 percent), "INDOPOL H-100R" (available from Amoco and having a number average molecular weight of about 940), "INDOPOL H-100R" (available from Amoco and having a number average molecular weigh of about 916), "ULTRAVIS 1000" (available from British Petroleum and having a number average molecular weight of about 970), etc.

Acid catalyst materials which may be employed in the practice of one embodiment of the disclosed process include, but are not limited to, solid acid catalysts based on solid metal oxides and molecular sieve or acid resin catalysts, etc. Examples include, but are not limited to, molecular sieve or acid resin type catalysts.

Suitable solid resin catalysts include, but are not limited to, strong acidic ion exchange resin catalysts consisting of sulphonated polystyrene cross linked with divinylbenzene such as the "AMBERLYST" series catalysts available from Rohm and Haas Philadelphia, Pa. Specific examples of "AMBERLYST" acid resin catalysts include, but are not limited to, strongly acidic macroreticular cationic polymeric catalysts "AMBERLYST 15," "AMBERLYST 16," "AMBERLYST 18," and "AMBERLYST 1010;" very strongly acidic macroreticular cationic polymeric catalysts "AMBERLYST 35," and "AMBERLYST 36;" strongly acidic "gel"-type cationic polymeric catalysts "AMBERLYST 19," "AMBERLYST 31," "AMBERLYST 32," etc. Other examples of suitable acid resin catalysts include, but are not limited to "DOWEX 50," "DOWEX 2030," available from Dow Chemical, etc. Such catalysts are discussed, for example, in U. S. Pat. No. 4,144,138, which is incorporated herein by reference.

Other exemplary catalysts include, but are not limited to, phosphoric acid-on-titania catalyst of the type disclosed in U.S. Pat. No. 4,822,921 (which is incorporated herein by reference) or a heteropolyacid such as 12-tungstophosphoric acid or 12-molybdophosphoric acid supported on an inert support such as titania, etc.

Suitable organic solvents used in the disclosed process include, for example, any mixture of hydrocarbon compounds having a boiling point range from just less or equal to the boiling point of the selected hydroxyaromatic reactant compounds to about the boiling point of the undesirable alkylhydroxyaromatic byproduct.

In the practice of the disclosed method, an organic solvent mixture functions by providing multiple boiling point portions such that the lower boiling point portion of organic solvent mixture may be separated and removed with unreacted hydroxyaromatic leaving the higher boiling point organic solvent portion in a reaction product containing polyalkylhydroxyaromatic and alkylhydroxyaromatic compounds. Thus, alkylhydroxyaromatic by-products are advantageously maintained in the product stream with the polyalkylhydroxyaromatic polymeric compound, allowing continuous removal of the by-products from the alkylation process system.

With benefit of this disclosure, those of skill in the art will understand that organic solvent having the described boiling point range/s may be selected or formulated based on boiling points of a particular hydroxyaromatic reactant/s and corresponding alkylhydroxyaromatic by-product/s present in a particular alkylation system. In one exemplary embodiment, an organic solvent may be selected to have an initial boiling point from less than the boiling point of a selected hydroxyaromatic and a final boiling point to about the boiling point of a corresponding selected alkylhydroxyaromatic by-product. In one embodiment, it may be desirable that an initial boiling point of the organic solvent be at about 10° C. below the boiling point of the selected hydroxyaromatic, and/or a final boiling point of the organic solvent be at about the boiling point of the selected alkylhydroxyaromatic by-product.

An organic solvent may include as many components as necessary to provide a suitable boiling point range (as defined herein) for a particular hydroxyaromatic and alkylhydroxyaromatic compounds present in the alkylation system. Thus, an organic solvent may have as few as two components. However, in order to maximize separation of alkylhydroxyaromatic by-product from recycled hydroxyaromatic, it may be desirable to utilize an organic solvent having numerous components with boiling points between the boiling point of hydroxyaromatic and boiling point of alkylhydroxyaromatic byproduct. Examples of suitable organic solvent include mixtures of branched and/or linear chained alkanes having boiling points selected to fall within the desired boiling point range for specific alkylation reactants and products.

Although mixture of alkanes are employed in one embodiment, it would be understood the benefit of this disclosure that a mixture of any types of solvent compounds having the desired boiling point characteristics may be employed. Examples include, but are not limited to, substituted branched or linear chain alkanes, other branched or cyclic aliphatic and derivatives thereof.

Returning to FIG. 1, represented is a simplified schematic alkylation process suitable for use with a variety of hydroxyaromatic and polyalkylene reactants. In one exemplary embodiment, the process illustrated in FIG. 1 may be employed to produce polyisobutylphenol from phenol and polyisobutylene. In such a process, a fresh phenol feed stream 10 is combined with a recycle phenol stream 22 and charged to alkylation reactor 50 via combined phenol feed stream 16. At the same time, organic solvent feed stream 12 and polyisobutylene feed stream 14 are combined and introduced to alkylation reactor 50 via feed stream 18. Alkylation reactor 50 contains a bed of acid catalysts comprising one or more suitable acid catalysts described elsewhere herein. In this embodiment, alkylation reactor 50 may be operated at a temperature of between about 0° C. and about 100° C., a pressure from about zero psia to about 500 psia. Within alkylation reactor 50, phenol and polyisobutylene ("PIB") react to form a reaction product comprising polyisobutylphenol ("PIBP") and tertiarybutylphenol ("TBP"). A reaction stream 20 comprising PIBP, TBP, unreacted phenol and organic solvent is withdrawn from alkylation reactor 50 and introduced to distillation column 60.

Amount of catalyst relative to reactant volume or volume flow (depending on if batch or continuous method is employed) may be selected by those of skill in the art with benefit of this disclosure, it being understood that faster reaction times may be obtained with more catalyst relative to reactant volume. Furthermore, catalyst amount may be selected based on desired conversion to product, as well as contact time to be allotted in a given process. Exemplary embodiments of catalyst amount relative to reactant and solvent amounts may be found in the examples herein. In one embodiment, catalyst amount relative to total reactant amount may vary from about 10% to about 300% of the weight of catalyst employed in each of Examples 1–5 given herein relative to the total weight of polyalkylene and hydroxyaromatic reactants (i.e., grams of catalyst/grams of polybutylene+grams of phenol). In another embodiment, catalyst volume relative to polyalkylene reactant volume may vary from about 10% to about 300% of the weight of catalyst employed in each of Examples 1–5 herein relative to the weight of polyalkylene reactant (i.e., grams of catalyst/grams of polybutylene). In yet another embodiment, catalyst amount relative to hydroxyaromatic reactant amount may vary from about 10% to about 300% of the weight of catalyst employed in each of Examples 1–5 herein relative to the weight of hydroxyaromatic reactant (i.e., grams of catalyst/grams of phenol).

For the above-described preparation of polyisobutylphenol from polyisobutylbutene and phenol, an exemplary suitable organic solvent may have a boiling point range from about 182° C. (boiling point of phenol) to about 239° C. (boiling point of para-polyisobutylphenol), alternatively such an organic solvent may have an initial boiling point of between about 170° C. and about 190° C., and a final boiling point of between about 220° C. and about 250° C. Further alternatively, such an organic solvent may have a boiling point range from about 170° C. to about 250° C. It will be understood with benefit of this disclosure by those of skill in the art that these temperature ranges are exemplary only, and that benefits of the disclosed method may be realized using organic solvents having initial and/or final boiling points outside these ranges as well.

Examples of organic solvent mixtures suitable in the practice of such an embodiment include, but are not limited to mixtures of alkanes having carbon chain lengths varying from between about 10 carbon atoms to about 14 carbon atoms. Specific examples of organic solvent mixtures suitable for use in this embodiment include, but are not limited to, "EXXPAR 252" and EXXPAR 251" available from Exxon, etc. It will be understood the benefit of this disclosure by those skilled in the art that alternative organic solvent mixtures having numbers of carbon atoms less than 10 and greater than 14 may also be employed, for example organic solvent mixtures comprised of alkanes having carbon chain lengths from about 8 carbon atoms to about 16 carbon atoms.

Returning again to FIG. 1, flow of phenol and polyisobutene is regulated in the above-described embodiment so that a molar excess of phenol is present in alkylation reaction vessel 50. For example, a molar ratio of phenol to PIB may be from about 1.1 to about 10 moles phenol per molar equivalent of polyisobutene, alternatively from about 1.5 to about 3 moles of phenol to molar equivalent of polyisobutylene. In one embodiment, total phenol feed stream 16 to alkylation reactor 50 comprises from about 10 weight percent to about 70 weight percent fresh unreacted phenol feed 10 with a balance of phenol provided by recycle stream 22. With benefit of this disclosure, those of skill in the art will understand that proportion of fresh phenol to unreacted phenol will vary according to reaction conversion characteristics.

In the practice of the disclosed process, organic solvent may be provided in any amount suitable to ensure smoothness of the process, for example, any amount suitable to reduce accumulation of undesirable alkylhydroxyaromatics in a reactor/s of the process. However in one embodiment, the amount of organic solvent introduced to the reactor vessel 50 may be from about 20 percent to about 50 percent by weight, alternatively from about 25 percent to about 50 percent by weight, of the total feed to the reactor (e.g., the total of feed streams 16 and 18 in the embodiment of FIG. 1). In this regard, in the polyisobutyl phenol embodiment of FIG.1, about 50 percent by weight of the total organic solvent mixture provided to the reactor may be provided by flow stream 12 with the remaining about 50 percent by weight of the total organic solvent being provided by recycle stream 22. With benefit of this disclosure, those of skill in the art will understand that flow stream 12 may comprise a greater percentage of higher molecular weight or higher boiling point components of organic solvent to make up for loss of such components in stream 24. For example, in an exemplary embodiment employing an organic solvent having a boiling point range of from about 170° C. to about 250° C., flow stream 12 may comprise an organic solvent having a boiling point range of from about 190° C. to about 250° C. after steady state reaction conditions are achieved.

Reaction stream 20 is withdrawn from alkylation reaction vessel 50 and in one embodiment comprises from about 35 weight percent to about 60 weight percent polyisobutylphenol; from about 0.1 weight percent to about 2 weight percent tert-butylphenol; from about 5 weight percent to about 10 weight percent unreacted phenol; and from about 25 weight percent to about 50 weight percent organic solvent. Reaction stream 20 is introduced to distillation column 60 in which at least a portion of unreacted phenol is separated along with a portion of organic solvent and recycled to alkylation reactor 50 via stream 22. In one embodiment, recycle stream 22 comprises from about 10 weight percent to about 20 weight percent unreacted phenol and from about 80 weight percent to about 90 weight percent of organic solvent, with concentration of tert-butyl phenol being less than about 2 weight percent, alternatively less than about 1 weight percent, alternatively from about 0 weight percent to about 2 weight percent, and further alternatively from about 0 weight percent to about 1 weight percent. Although not necessary to achieve benefit from the disclosed method, tert-butyl phenol concentration in reactor 50 may reach an acceptable steady state value of from about 0.1 weight percent to about 1.5 weight percent.

Product stream 24 is removed from distillation column 60 and in one embodiment comprises from about 45 weight percent to about 80 weight percent, alternatively from about 45 weight percent to about 70 weight percent polyisobutylphenol; from about 0.1 weight percent to about 3 weight percent tertiary butylphenol; and from about 15 weight percent to about 30 weight percent organic solvent.

To achieve the separation in distillation column 60 described above, those of skill in the art will understand with benefit of this disclosure that any combination of temperature and pressure (e.g., including reduced pressure or vacuum) may be employed that is suitable to achieve the desired separation of components, in this embodiment separation of phenol component from polyisobutylphenol and tertiary butyl phenol components. In this regard, at atmospheric pressure distillation column 60 may be operated at a temperature of, for example, from about 200° C. to about 210° C. to achieve the desired separation in the polyisobuytlphenol embodiment described above. With reduced pressure and/or vacuum, a reduced distillation temperature may be employed. In one embodiment where distillation column 60 is operated at atmospheric pressure and at a temperature of about 210° C., recycle stream 22 will consist of reaction stream components having a boiling point less than about 210° C. (including phenol and organic solvent components having boiling points less than about 210° C.) and product stream 24 will consist of components having boiling points greater than about 210 ° C. (including tertbutylphenol and organic solvent mixture components having a boiling point greater than about 210° C.).

It will be understood that the concentration values given herein for various components of the reactant streams, recycle streams and product streams are exemplary only, and that other concentration values may exist which allow benefits to be realized from the disclosed method.

EXAMPLES

The following examples are illustrative and should not be construed as limiting the scope of the invention or claims thereof.

Example 1

To a 1-liter flask equipped with a thermometer, stirrer, and nitrogen outlet, was charged 308.4 g of INDOPOL® H-100R (molecular weight 940), 56.4 g of phenol, 237.7 g of paraffin organic solvent mixture (EXXPAR® 252), and 60 g of pre-dry Amberlyst® 15. The mixture was heated to 55° C. for nine hours. The reaction solution was filtered. The resulting solution was then distilled to remove the solvent and unreacted phenol at up to 150° C. and about 45 mmHg pressure. Seven cuts, about 30 g each, were taken. The first two cuts were two phases, with the solid phase analyzed to be phenol. The last two cuts were also two phases, with the solid phase analyzed to be tert-butylphenol. This example shows that the phenol along with part of the organic solvent mixture may be recycled and that tert-butylphenol may be kept in the product by controlling the distillation temperature. The resulting product was analyzed to contain about 50% of the desired product by IR spectroscopy and proton NMR.

Example 2

To a 1-liter flask equipped with a thermometer, stirrer, and nitrogen outlet, was charged 300 g of INDOPOL® H-100HR (molecular weight 916), 56.4 g of phenol, 118.8 g of paraffin (EXXPAR 252), and 60 g of pre-dry Amerlyst 15. The mixture was heated to 55° C. for seven hours. The reaction solution was filtered. The resulting solution was then distilled to remove the solvent and unreacted phenol at up to 150° C. and about 45 Hg pressure. After no more overhead was collected, the resulting product was analyzed to contain about 75% of the desired product. Again, as Example 1 above also indicates, the distillation showed that phenol and tert butylphenol were collected in separate fractions.

Example 3

To a 5-liter flask equipped with a thermometer, stirrer, and nitrogen outlet, was charged 1380 g of Ultravis® 1000 (molecular weight 970), 260 g of phenol, 1000 g of paraffin (EXXPAR 252), and 275 g of pre-dry Amberlyst 15. The mixture was heated to 55° C. for seven hours and analyzed by IR spectroscopy to have a desired level of conversion. The liquid layer was decanted into another flask to undergo phenol removal. The solution was distilled at 50 mmHg pressure. About 560 g of phenol-paraffin solution was removed. The resulting product was analyzed to contain about 25% of paraffin and 56% of the desired product.

Example 4

To the flask containing catalyst layer from Example 3, was charged 1380 g of Ultravis 1000, 260 g of phenol, and 1000 g of paraffin (EXXPAR 252). The mixture was heated to 55° C. for seven hours and analyzed to have a desired level of conversion. The liquid layer was decanted into another flask to undergo phenol removal. The solution was distilled at 50 mmHg pressure. About 710 g of phenol-paraffin solution was removed. The resulting product was analyzed to contain about 23% of paraffin and 58% of the desired product.

Example 5

The procedure of Example 4 was followed except that it is the catalyst continuation of Example 4 instead of Example 3. The resulting product was analyzed to contain about 28% of paraffin and 54% of the desired product. The results of this example show that no apparent catalyst deactivation occurred after the catalyst was used.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed compositions and methods may be utilized in various combinations and/or independently. Thus the invention is not limited to only those combinations shown herein, but rather may include other combinations.

What is claimed is:

1. A process for preparing polyalkyl hydroxyaromatic, comprising:

contacting hydroxyaromatic and polyalkylene with an acid catalyst in the presence of an organic solvent to form a reaction component comprising polyalkyl hydroxyaromatic, alkylhydroxyaromatic by-product, unreacted hydroxyaromatic and said organic solvent; and separating by distillation at least a portion of said unreacted hydroxyaromatic from said reaction component to form a product component comprising polyalkyl hydroxyaromatic;

wherein said organic solvent has a boiling point range with an initial boiling point sufficiently close to the boiling point of the hydroxyaromatic reactant and a final boiling point sufficiently close to the boiling point of said alkylhydroxyaromatic by-product such that reduced concentrations of alkylhydroxyaromatic by-product is present in said unreacted hydroxyaromatic separated by distillation from said polyhydroxyaromatic product as compared to such a separation carried out employing an organic solvent having a boiling point less than the boiling point of said hydroxyaromatic reactant.

2. The process of claim 1, wherein said unreacted hydroxyaromatic is separated from said reaction component as a separation component comprising less than about 2 weight percent of said alkyl hydroxyaromatic.

3. The process of claim 2, wherein said separation component comprises a portion of the organic solvent from said reaction component, and wherein said product component comprises the balance of the organic solvent from said reaction component.

4. The process of claim 1, wherein said contacting occurs in a reaction vessel; wherein said hydroxyaromatic, polyalkylene and organic solvent are introduced into said reaction vessel as one or more fresh feed streams; wherein said reaction component is taken from said reaction vessel as at least one reaction stream; wherein at least a portion of said unreacted hydroxyaromatic is separated from said reaction stream to form a product stream comprising polyalkyl hydroxyaromatic, said unreacted hydroxyaromatic being returned to said reaction vessel and introduced therein as a recycle stream.

5. The process of claim 4, wherein said recycle stream comprises less than about 2 weight percent of said alkyl hydroxyaromatic.

6. The process of claim 5, wherein said recycle stream further comprises a portion of the organic solvent from said reaction stream, and wherein said product stream comprises the balance of the organic solvent from said reaction stream.

7. The process of claim 5, wherein accumulation of alkyl hydroxyaromatic content in said reaction stream is substantially prevented.

8. The process of claim 1, wherein said acid catalyst is at least one of acid resin catalyst, acidic metal oxide, acidic molecular sieves, or a mixture thereof.

9. The process of claim 1, wherein said polyalkylene comprises polybutylene, wherein said alkyl hydroxyaromatic comprises tertiary butylphenol, and wherein said polyalkyl hydroxyaromatic comprises polybutylphenol.

10. The process of claim 1, wherein said organic solvent comprises a mixture of alkanes having carbon chain lengths varying within the range of from about 8 to about 16 carbon atoms.

11. A process for preparing polybutylphenol, comprising:
introducing phenol, polybutylene and organic solvent components into a reaction vessel containing an acid catalyst, said components being introduced separately or in combination as one or more feed streams, said organic solvent comprising a mixture of alkanes and having a boiling point range with an initial boiling point of from less than about the boiling point of said phenol to about 190° C. and a final boiling of from about 210° C. to greater than about the boiling point of said tertiary butylphenol, and wherein said acid catalyst comprises at least one of acid resin catalyst, acidic metal oxide, acidic molecular sieves, or a mixture thereof;

reacting at least a portion of said phenol with at least a portion of said polybutylene at temperature of from about 0° C. to about 100° C. in the presence of said acid catalyst to form a reaction product comprising polybutylphenol and tert butylphenol;

withdrawing said reaction product as at least one reaction stream from said reaction vessel, said reaction stream comprising polybutylphenol, tert butylphenol, unreacted phenol and said solvent;

separating at least a portion of said unreacted phenol from said reaction stream by distillation at a temperature and pressure effective to form a product stream comprising polybutylphenol, tert-butyl phenol and solvent, and a recycle stream comprising phenol, solvent, and less than or equal to about 2% by weight tert-butylphenol; and introducing said recycle stream into said reaction vessel with said one or more feed streams.

12. The process of claim 11, wherein said polybutylene has a number average molecular weight of from about 300 to about 5000.

13. The process of claim 11, wherein said recycle stream comprises from about 10% to about 20% by weight of phenol, from about 0% to about 2% by weight of tertiary butylphenol, and from about 80% to about 90% by weight of said solvent; and wherein said product stream comprises from about 45% to about 80% by weight of polybutylphenol, from about 0.1% to about 3% by weight of tert-butylphenol, and from about 10% to about 30% by weight of said solvent.

14. The process of claim 11, wherein a build up of tertiary butylphenol content in said reaction stream is substantially prevented.

15. The process of claim 11, wherein said organic solvent comprises a mixture of alkanes having carbon chain lengths varying within the range of from about 8 to about 16 carbon atoms.

16. The process of claim 11, wherein said organic solvent comprises a mixture of alkanes having carbon chain lengths varying within the range of from about 10 to about 14 carbon atoms.

17. The process of claim 11, wherein said acid catalyst comprises acid resin catalyst.

18. The process of claim 11, wherein said initial boiling point of said organic solvent is from about 160° C. to about 190° C.; and wherein said final boiling point of said solvent is from about 210° C. to about 350° C.

19. A process for preparing polybutylphenol, comprising:
introducing phenol, polybutylene and organic solvent components into a reaction vessel containing an acid catalyst, said organic solvent mixture comprising a mixture of alkanes and having a boiling point range with an initial boiling point of from about 160° C. to about 180° C. and a final boiling point of from about 210° C. to about 300° C., and said acid catalyst comprising an acid resin catalyst;

reacting at least a portion of said phenol with at least a portion of said polybutylene at temperature of from about 0° C. to about 100° C. in the presence of said acid catalyst to form a reaction product comprising polybutylphenol and tert butylphenol;

withdrawing said reaction product as at least one reaction stream from said reaction vessel, said reaction stream comprising polybutylphenol, tert butylphenol, unreacted phenol and said solvent;

separating at least a portion of said unreacted phenol from said reaction stream by distillation at a temperature and pressure selected to form a product stream comprising polybutylphenol, tert-butyl phenol and solvent, and a recycle stream comprising from about 10% to about 20% by weight phenol, from about 80% to about 90% by weight solvent, and from about 0% to about 2% by weight tert butylphenol; and introducing said recycle stream into said reaction vessel with said one or more feed streams;

wherein said polybutylene has a number average molecular weight of from about 300 to about 5000; and wherein said product stream comprises from about 45% to about 80% by weight of polybutylphenol, from about 0.1% to about 3% by weight of tert butylphenol, and from about 15% to about 30% by weight of said solvent.

20. The process of claim 19, wherein a build up of tertiary butylphenol content in said reaction stream is substantially prevented.

21. The process of claim 19, wherein said recycle stream comprises from about 0% to about 1% by weight of tertiary butylphenol.

22. The process of claim 19, wherein said initial boiling point of said organic solvent is about 170° C.; and wherein said final boiling point of said solvent is from about 250° C.

* * * * *